(12) United States Patent
Cho et al.

(10) Patent No.: US 7,987,833 B2
(45) Date of Patent: Aug. 2, 2011

(54) COMBUSTION SYSTEM FOR VEHICLE

(75) Inventors: Sung Hwan Cho, Yongin (KR); Jang Heon Kim, Suwon (KR); Kyoung-Doug Min, Seoul (KR); Yong-Taik Han, Seongnam (KR); Seung-Mok Choi, Seoul (KR); Kyeong-Hyeon Lee, Seoul (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 0 days.

(21) Appl. No.: 12/510,106

(22) Filed: Jul. 27, 2009

(65) Prior Publication Data

US 2010/0065017 A1    Mar. 18, 2010

(30) Foreign Application Priority Data

Sep. 12, 2008  (KR) .................. 10-2008-0090343

(51) Int. Cl.
*F02F 3/26* (2006.01)
*F02M 25/07* (2006.01)

(52) U.S. Cl. ........ 123/279; 123/301; 123/302; 123/308; 123/568.21

(58) Field of Classification Search ............... 123/193.6, 123/197.2, 256, 276, 279, 281, 282, 285, 123/302, 661, 568.11, 568.13, 568.14, 307, 123/301, 306, 308, 315, 432, 188.14, 568.2, 123/568.21
See application file for complete search history.

(56) References Cited

U.S. PATENT DOCUMENTS

| | | | |
|---|---|---|---|
| 5,622,150 A * | 4/1997 | Fraidl et al. | 123/307 |
| 6,213,086 B1 * | 4/2001 | Chmela et al. | 123/276 |
| 6,609,506 B2 * | 8/2003 | Matsuura et al. | 123/568.11 |
| 6,651,614 B2 * | 11/2003 | Flamig-Vetter et al. | 123/301 |
| 6,745,745 B2 * | 6/2004 | Huebler et al. | 123/307 |
| 7,093,590 B2 * | 8/2006 | Shimazaki et al. | 123/568.14 |
| 7,258,104 B2 * | 8/2007 | Young et al. | 123/432 |
| 7,640,094 B2 * | 12/2009 | Ishikawa et al. | 701/105 |
| 2003/0140891 A1 * | 7/2003 | Cathcart et al. | 123/301 |
| 2003/0217732 A1 * | 11/2003 | Kataoka et al. | 123/276 |
| 2004/0003793 A1 * | 1/2004 | Saruwatari et al. | 123/307 |
| 2007/0023005 A1 * | 2/2007 | Chmela | 123/305 |
| 2009/0070002 A1 * | 3/2009 | Ishikawa | 701/103 |

FOREIGN PATENT DOCUMENTS

| | | |
|---|---|---|
| JP | 11-343851 A | 12/1999 |
| JP | 2005282565 A * | 10/2005 |
| JP | 3842047 B2 | 8/2006 |

* cited by examiner

*Primary Examiner* — Willis R Wolfe, Jr.
*Assistant Examiner* — Johnny H Hoang
(74) *Attorney, Agent, or Firm* — Morgan, Lewis & Bockius LLP

(57) ABSTRACT

A combustion system for a vehicle may include a piston in which a first combustion recess is formed in an upper end surface thereof, and at least one second combustion recess is further formed at the bottom of the first combustion recess, a first intake port and a second intake port for supplying a cylinder with air, and a controller that differently controls amounts of recirculation exhaust gas being supplied to the first intake port and the second intake port.

12 Claims, 8 Drawing Sheets

Conventional piston　　　　　Improved piston

COMBUSTION SYSTEM FOR VEHICLE

CROSS-REFERENCE TO RELATED APPLICATIONS

The present application claims priority to Korean Patent Application No. 10-2008-0090343 filed on Sep. 12, 2008, the entire contents of which are incorporated herein for all purposes by this reference.

BACKGROUND OF THE INVENTION

1. Field of the Invention

The present invention relates to a combustion system for a vehicle, and more particularly, to a combustion system for a vehicle that reducing particulate matter and nitrogen oxide (NOx) of exhaust gas.

2. Description of Related Art

Generally, the exhaust gas of a diesel engine includes particulate matter and nitrogen oxide. However, the main component of the particulate matter, that is, soot, can be reduced at a high temperature in an oxygenation state, and the nitrogen oxide is mostly generated in a high temperature area.

An exhaust gas recirculation (EGR) system that recirculates exhaust gas into a combustion chamber is used to eliminate the nitrogen oxide.

That is, as the exhaust gas concentration becomes higher in the combustion chamber, the combustion temperature is decreased to reduce the nitrogen oxide. However, as the recirculation of the exhaust gas is increased, there is a problem that the oxygen concentration is decreased to increase particulate matter.

Techniques for stratifying the exhaust gas have been researched so as to resolve the above problem. That is, as the recirculation exhaust gas is stratified in the combustion chamber, the nitrogen oxide is reduced in an exhaust gas dense area of the combustion chamber and the soot that is generated from the exhaust gas dense area is oxidized in an oxygen dense area such that the two harmful exhaust materials that are in trade-off relationship can be simultaneously reduced.

Generally, when one combustion groove is formed in a piston, the concentration of the recirculation exhaust gas are max 34.7% and min 28.9% in a case in which 100% air is supplied from a first intake port and 60% recirculation exhaust gas is supplied from a second intake port, and therefore the difference of the concentration is little.

Accordingly, there is a problem in which the stratification of the recirculation exhaust gas is hardly achieved. The reason why the stratification of the recirculation exhaust gas is hardly achieved is that the dense area of the recirculation exhaust gas and the oxygen dense area that are separated at an early stage of a compression stroke are promoted to be mixed with each other by a squish flow at a last stage of the compression stroke.

Further, the conventional stratification technique stratifies the exhaust gas concentration toward the edge from the center portion of the combustion chamber, and therefore the gas of the center portion is mixed to the edge portion by the fuel that is injected from the center to the edge before ignition such that the stratification efficiency is reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a combustion system for a vehicle having advantages of stratifying the recirculation exhaust gas so as to reduce nitrogen oxide and particulate matter.

In an aspect of the present invention, the combustion system for a vehicle, may include a piston in which a first combustion recess is formed in an upper end surface thereof, and at least one second combustion recess is further formed at a bottom surface of the first combustion recess; a first intake port and a second intake port for supplying a cylinder with air; and a controller that differently controls amounts of a recirculation exhaust gas being supplied to the first intake port and the second intake port.

An EGR valve may be on/off controlled for the recirculation exhaust gas to be supplied to the first intake port or the second intake port for a partial period while the intake valve is opened, wherein the recirculation exhaust gas is supplied for a determined period until the intake valve is closed.

A diameter of the second combustion recess may be smaller than a diameter of the first combustion recess to form a terraced shape.

A slanted portion may be formed on a boundary disposed between the first combustion recess and the second combustion recess, wherein the slanted portion extends toward the upper end surface of the position with a predetermined angle as the slanted portion goes to a center portion of the piston and wherein an edge side surface of the first combustion recess is disposed lower than a top surface of the slanted portion.

A bottom surface of the last second combustion recess may be formed to be flat.

A slanted middle portion that becomes closer toward the upper end surface of the piston as the slanted middle portion goes to a center portion of the piston may be formed in a bottom surface of the last second combustion recess.

The first combustion recess may have a first depth from the upper end surface of the piston and the second combustion recess has a second depth that is deeper than the first depth from the upper end surface of the piston, wherein an exhaust gas dense portion is formed in one side among the first combustion recess and the second combustion recess, and an oxygen dense portion is formed in the other side thereof such that a stratification of the exhaust gas is simultaneously achieved in a radial direction as well as in an up/down direction and wherein a fuel is injected to the exhaust gas dense portion so that combustion of the fuel can be started in the exhaust gas dense portion and wherein oxygen of the oxygen dense portion is mixed in a combustion area to oxidize and eliminate soot therein.

The amount of the recirculation exhaust gas that is supplied through the first intake port may be smaller than that of the recirculation exhaust gas that is supplied through the second intake port.

The recirculation exhaust gas may not be supplied to one of the first and second intake ports, and is supplied to the other.

In further another exemplary embodiment of the present invention, a combustion system for a vehicle, may include a piston that is disposed in a cylinder to perform intake, compression, power, and exhaust strokes, and in which a first combustion recess is formed in an upper end surface thereof and at least one second combustion recess is further formed at a bottom surface of the first combustion recess; a first intake port that is connected to a first intake opening of the cylinder and a second intake port that is connected to a second intake opening of the cylinder; and a controller that supplies a recirculation exhaust gas to at least one intake port of the first intake port and the second intake port, and that differently controls the amount of the recirculation exhaust gas that is supplied through the first and second intake ports so as to stratify an exhaust gas between the first combustion recess and the second combustion recess.

In various aspects of the present invention, the exhaust gas dense portion may be formed in the first combustion recess of the upper portion of the piston at the last stage of the compression stroke, and the oxygen dense portion may be formed in the second combustion recess while the fuel is injected to the first combustion recess for the ignition to be started in the exhaust gas dense portion, and thereby the nitrogen oxide can be reduced.

Also, the ignition timing may be retarded by the high density of the recirculation exhaust gas, and thereby the mixture of the fuel and the air is promoted and the equivalence ratio becomes less than 2 in an aspect of the combustion environment such that the generation of the soot is suppressed.

The oxygen of the second combustion recess may flow into the first combustion recess by the converse-squish flow in the expansion stroke, and the soot may be oxidized by the oxygen to be eliminated.

Further, the high density of the recirculation exhaust gas may be partially achieved in a relatively low condition of the recirculation exhaust gas and the low temperature combustion at lower than 1600K is achieved to reduce the nitrogen oxide and the soot, and the recirculation technique for the exhaust gas may be applied to a high load condition in which the recirculation technique is difficult to apply.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
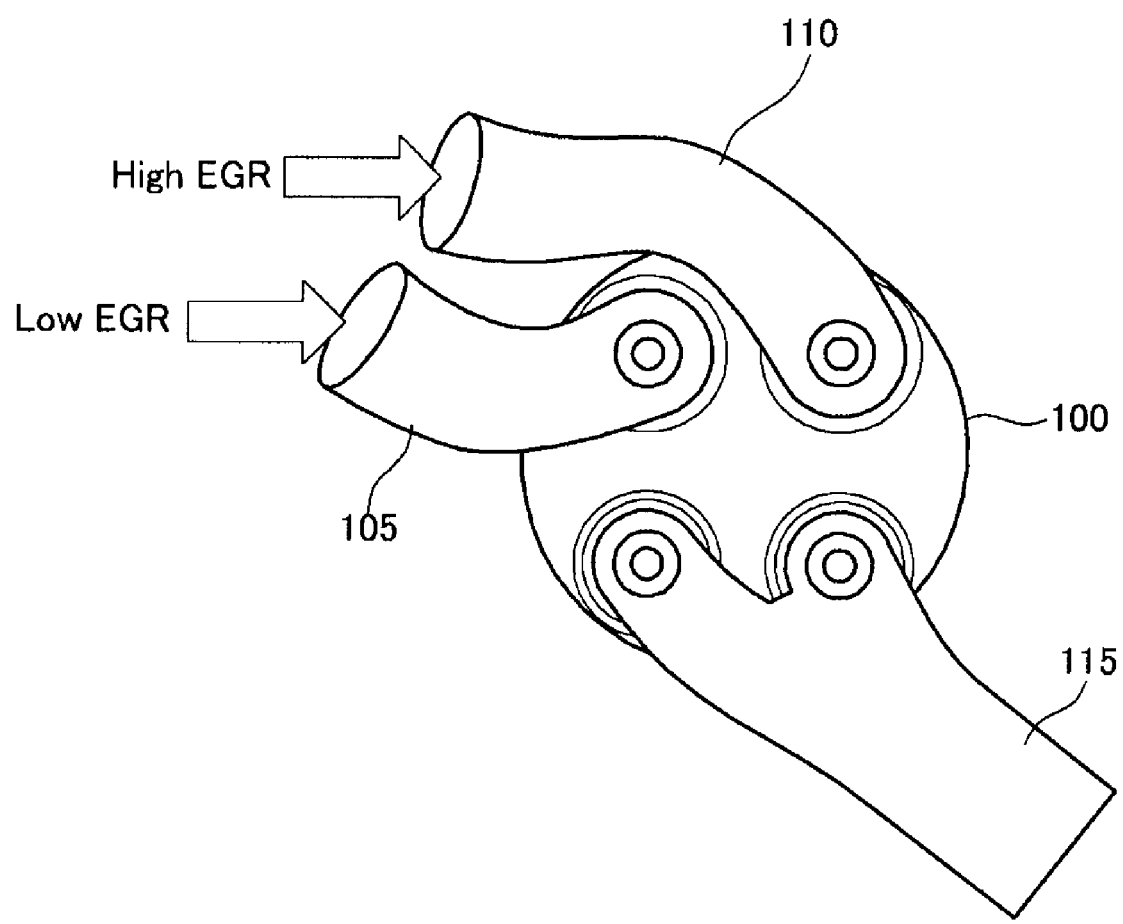
FIG. 1 is a partial top plan view of an exemplary vehicle combustion system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a partial top plan view of a vehicle combustion system according to various embodiments of the present invention.

Referring to FIG. 1, a diesel combustion system includes a cylinder 100, a first intake port 105, a second intake port 110, and an exhaust pipe 115. In this case, the first intake port 105 can be called a helical port and the second intake port 110 can be called a tangential port.

The first intake port 105 is connected to a first intake opening, the second intake port 110 is connected to a second intake opening, and the exhaust pipe 115 is connected to an exhaust port of the cylinder in various embodiments of the present invention.

A portion of the exhaust gas that is exhausted through the exhaust pipe 115 is recirculated through the first intake port 105 and the second intake port 110.

A small amount of exhaust gas is recirculated to the first intake port 105 and a large amount of exhaust gas is recirculated to the second intake port 110 in various embodiments of the present invention. Accordingly, the recirculation exhaust gas inside the cylinder 100 is stratified such that the particulate matter and the nitrogen oxide are simultaneously reduced.

A controller controls a control valve so as to supply the first intake port 105 and the second intake port 110 with the recirculation exhaust gas, and differently controls the amount of recirculation exhaust gas that is supplied through the first and second intake ports so as to stratify the concentration of the exhaust gas according to various embodiments of the present invention.

Figure 2:
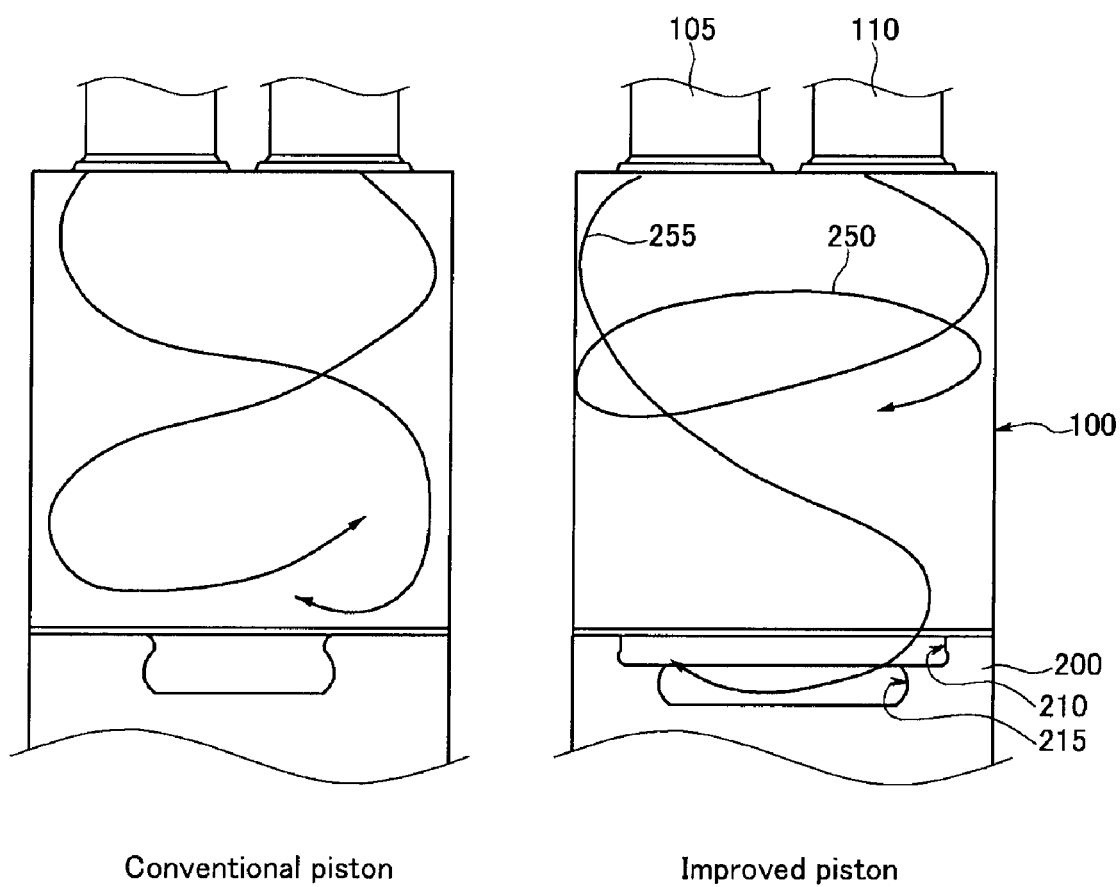
FIG. 2 is a schematic side view of an exemplary vehicle combustion system according to the present invention.

FIG. 2 is a schematic side view of a vehicle combustion system according to various embodiments of the present invention.

Referring to FIG. 2, exhaust gas that flows in through the first intake port 105 moves to a lower portion of the cylinder 100 according to a first flow 255, and exhaust gas that flow in through the second intake port 110 moves to upper and middle portions thereof according to the second flow 250.

Compared with a prior art piston, when a two-step piston is used, the exhaust gas that flows into the first intake port moves in a lower portion of the cylinder and the exhaust gas that flows into the second intake port moves in an upper portion of the cylinder such that the stratification of the exhaust gas is increased during a compression stroke.

As described above, the stratification of the exhaust gas can be achieved in the cylinder 100 during intake stroke by injecting different amounts of exhaust gas into the first and second intake ports 105 and 110.

Referring to FIG. 2, the piston 100 is disposed inside the combustion chamber of the cylinder 100, and a first combustion groove or recess 210 and a second combustion groove or recess 215 are formed on the piston 200. The structure of the first and second combustion grooves or recesses 210 and 215 is described in detail with reference to FIG. 3.

Further, the controller according to various embodiments of the present invention differently controls the amount of the recirculation exhaust gas that is supplied through the first and second intake ports so as to stratify the concentration of the exhaust gas at the first and second combustion recesses 210 and 215.

Figure 3:
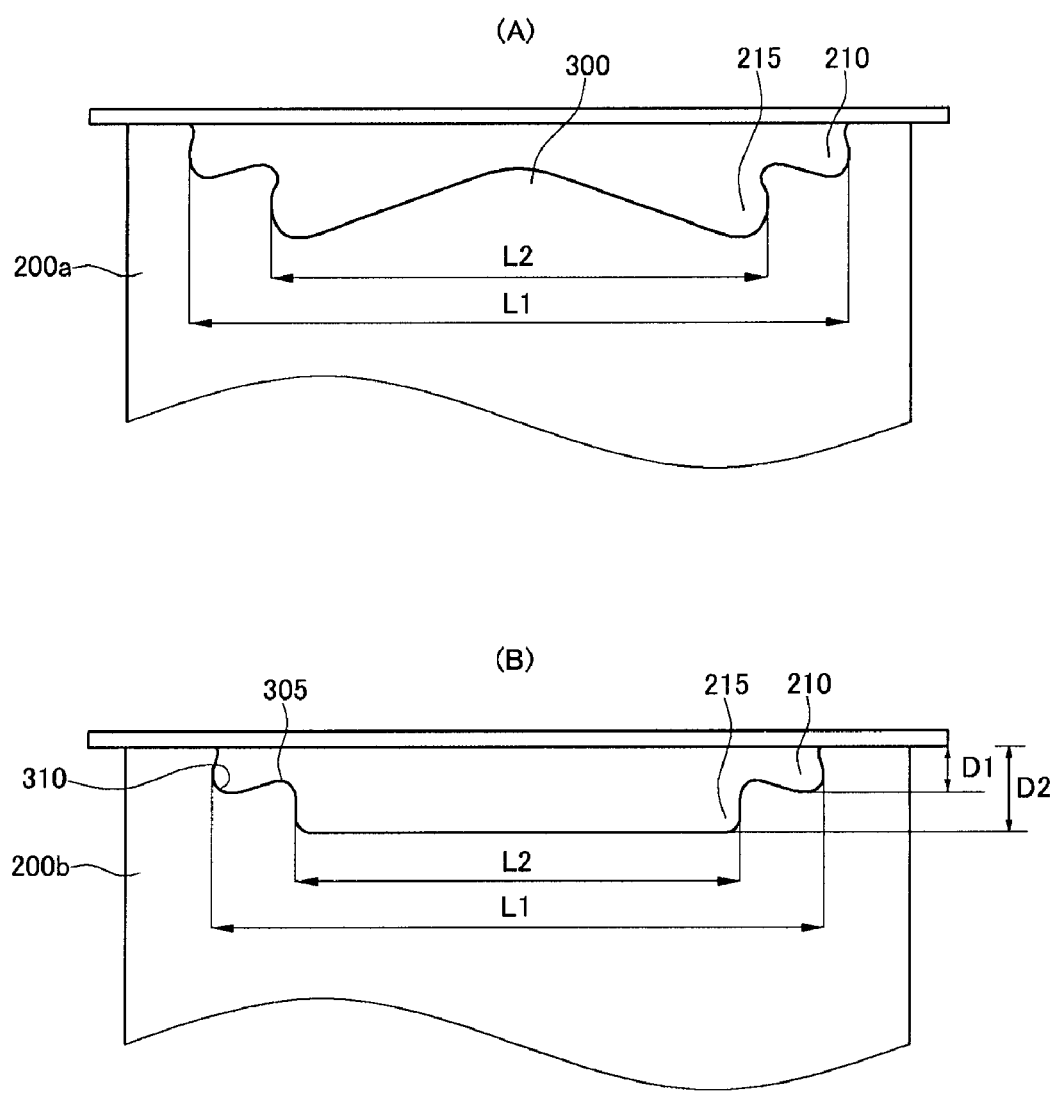
FIG. 3 is a partial cross-sectional side view of a piston of an exemplary vehicle combustion system according to the present invention.

FIG. 3 is a partial cross-sectional side view of a piston of a vehicle combustion system according to various embodiments of the present invention.

Referring to (A) of FIG. 3, a combustion recess is formed in an upper end portion of a piston 200a, and the combustion recess includes the first combustion recess 210 and the second combustion recess 215.

The first combustion recess 210 is formed in a grooved or recessed structure on the upper end surface of the piston 200a, and the second combustion recess 215 is formed on a bottom surface of the first combustion recess 210. Accordingly, the first and second combustion recesses 210 and 215 have a terraced structure according to various embodiments of the present invention.

In various embodiments of the present invention, a first slanted surface portion 300 in which the middle portion thereof protrudes towards the upper side of the piston 200a is formed on the bottom surface of the second combustion recess 215. As shown in the (A) of FIG. 3, it is desirable that a first diameter L1 of the first combustion recess 210 is greater than a second diameter L2 of the second combustion recess 215.

In other embodiments of the present invention, referring to (B) of FIG. 3, the first and second combustion recesses 210 and 215 are formed in an upper end portion of the piston 200b, and the bottom surface of the second combustion recess 215 is formed to be flat.

As shown in (B) of FIG. 3, it is desirable that a first diameter L1 of the first combustion recess 210 is greater than a second diameter L2 of the second combustion recess 215. Further, when the depths of the first and second combustion recesses 210 and 215 from the upper end surface of the piston are compared, the first combustion recess 210 has a first depth D1 and the second combustion recess 215 has a second depth D2, and it is desirable that the second depth D2 is greater than the first depth D1.

As shown in (B) of FIG. 3, a second slanted surface portion 305 is formed on a boundary disposed between the first and second combustion recesses 210 and 215 and configured to be higher than an edge side surface 310 of the first combustion recess 210 that has a curved line structure concave in an exterior circumference direction of the piston 200b.

Referring to FIG. 3, it is desirable that the fuel is injected to the first combustion recess 210 from the upper end middle portion of the cylinder 100.

Figure 4:
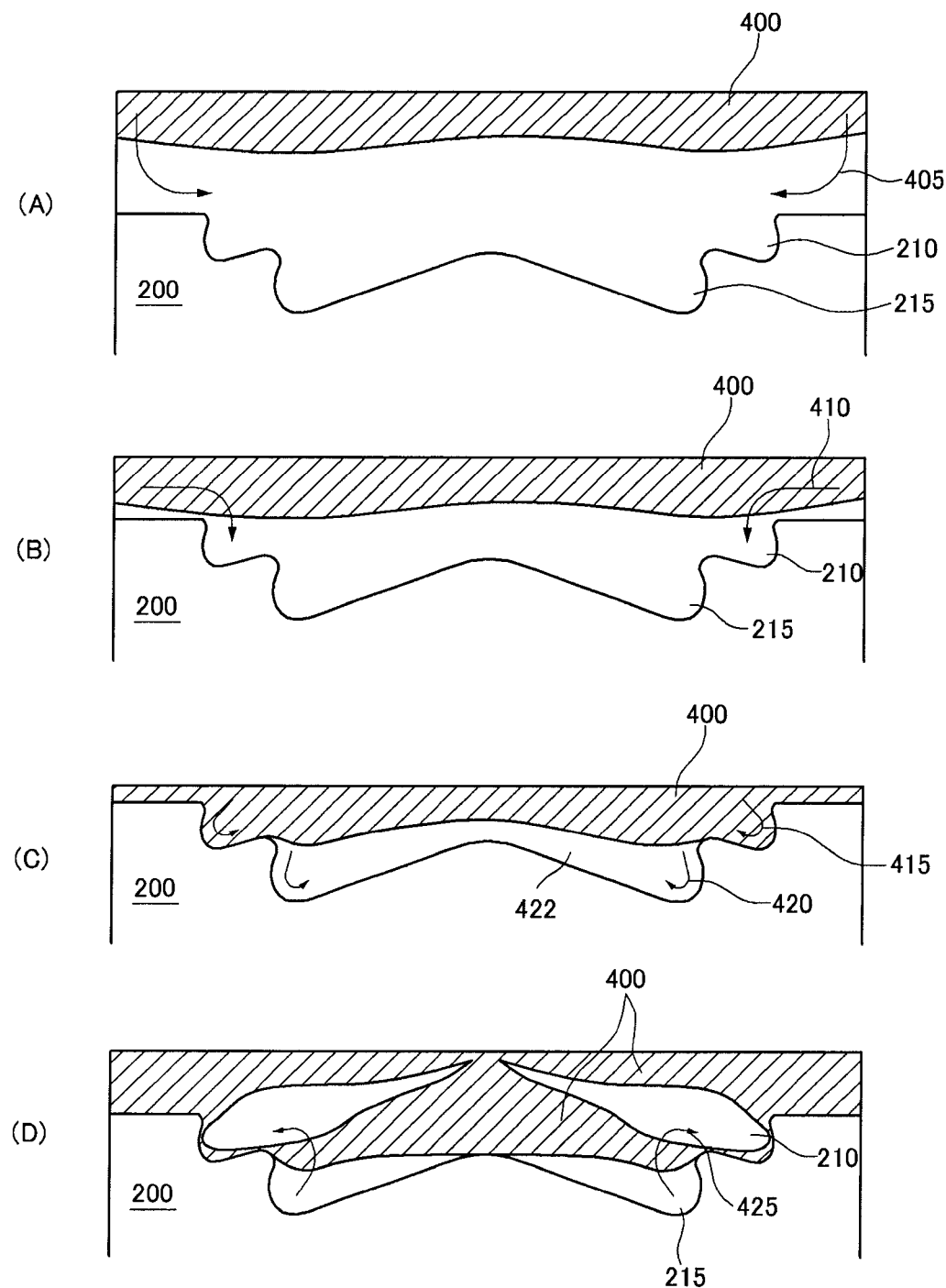
FIG. 4 is a cross-sectional side view showing a flow in a compression stroke of an exemplary vehicle combustion system according to the present invention.

FIG. 4 is a cross-sectional side view showing flow in a compression stroke of a vehicle combustion system according to various embodiments of the present invention.

Referring to (A) of FIG. 4, when the piston 200 moves in an up/down direction, an exhaust gas dense portion 400 is formed in an upper portion of the combustion chamber and an oxygen dense portion 422 is formed in a lower portion of the combustion chamber at an early stage of the compression stroke, and some portion of the exhaust gas dense portion 400 moves in accordance with a first flow 405 that is generated by the compression stroke.

Referring to (B) of FIG. 4, according to the rise of the piston 200, a portion of the exhaust gas dense portion 400 flows into the first combustion recess 210 of the piston 200 through a second flow 410.

Referring to (C) of FIG. 4, according to the further rise of the piston 200, most of the exhaust gas dense portion 400 flows into an upper portion of the first combustion recess 215 through a third flow 415 and the exhaust gas dense portion 400 is formed in the first combustion recess 210. At this moment, the oxygen dense air of the first combustion recess flows into the second combustion recess through a fourth flow 420 to form an oxygen dense portion.

Through the above process, the recirculation exhaust gas is stratified in a radial direction and in an up/down direction at a last stage of the compression stroke. The fuel is injected to the first combustion recess and the combustion is started in the exhaust gas dense portion, and accordingly the combustion temperature is lowered and the generation of the nitrogen oxide is suppressed. Also, the ignition in the exhaust gas dense portion is retarded such that the equivalence ratio is lowered to suppress the soot generation.

Referring to (D) of FIG. 4, the gas including oxygen of the second combustion recess 215 moves to the first combustion recess through a fifth flow 425 in the power stroke after fuel injection. The soot that is generated in the first combustion recess is oxidized by the oxygen such that the soot generation is reduced.

In various embodiments of the present invention, the recirculation exhaust gas is stratified in a diameter direction and in an up/down direction of the cylinder 100, and it is desirable that the diesel fuel is directly injected into the first combustion recess 210 at which the concentration of the exhaust gas is relatively high.

Moreover, the structure of the cylinder and the supply method of the exhaust gas that are described above can be applied to a general gasoline intake system or a gasoline direct injection system.

Figure 5:
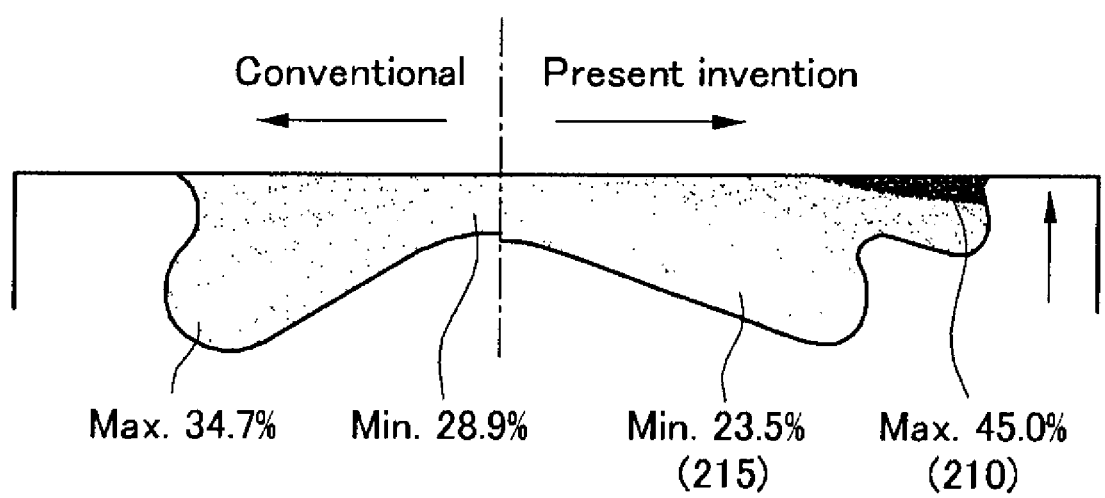
FIG. 5 is a cross-sectional side view showing an inhaled gas state in an exemplary vehicle combustion system according to the present invention.

FIG. 5 is a cross-sectional side view showing an inhaled gas state in a vehicle combustion system according to various embodiments of the present invention.

Referring to FIG. 5, the maximum concentration of the recirculation exhaust gas is 45% and the minimum concentration is 23.5% inside the cylinder 100, and therefore the difference thereof is 21.5%.

As described above, the recirculation exhaust gas is differently supplied to the first intake port 105 and the second intake port 110, and the piston 200 has the two-step combustion recesses 210 and 215 such that the stratification of the exhaust gas is efficiently achieved in the combustion chamber.

Figure 6:
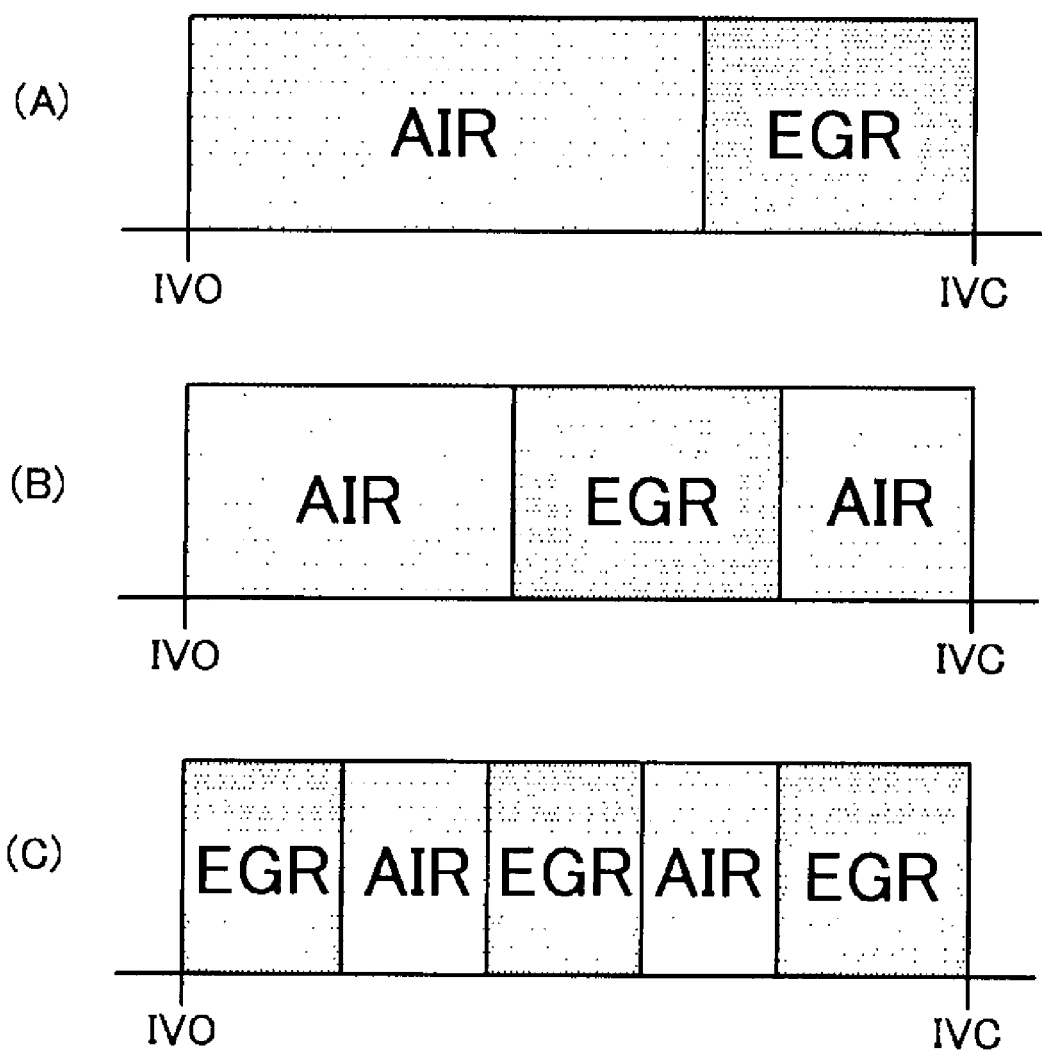
FIG. 6 is a table showing a state in which recirculation exhaust gas is being inhaled in an exemplary vehicle combustion system according to the present invention.

FIG. 6 is a table showing a state in which recirculation exhaust gas is being inhaled in a vehicle combustion system according to various embodiments of the present invention.

Referring to (A) of FIG. 6, "IVO" designates the moment when the intake valve is opened and "IVC" designates the moment when the intake valve is closed. Further, the recirculation exhaust gas is supplied for a predetermined period until the intake valve is closed.

Accordingly, the stratification of the exhaust gas is securely achieved in the combustion chamber.

Referring to (B) of FIG. 6, the exhaust gas is supplied in mid course. Also, referring to (C) of FIG. 6, the exhaust gas is supplied from the point when the intake valve is opened for a determined period and the exhaust gas is supplied for a determined period before the intake valve is closed.

As described above, when the air flows into the combustion chamber, the exhaust gas is supplied only for a predetermined period to improve the stratification of the exhaust gas and to control the stratification rate and the stratification position according to driving conditions.

In various embodiments of the present invention, the predetermined period can be controlled by an exhaust gas control valve and a controller that controls on/off states of the valve so as to recirculate the exhaust gas.

Figure 7:
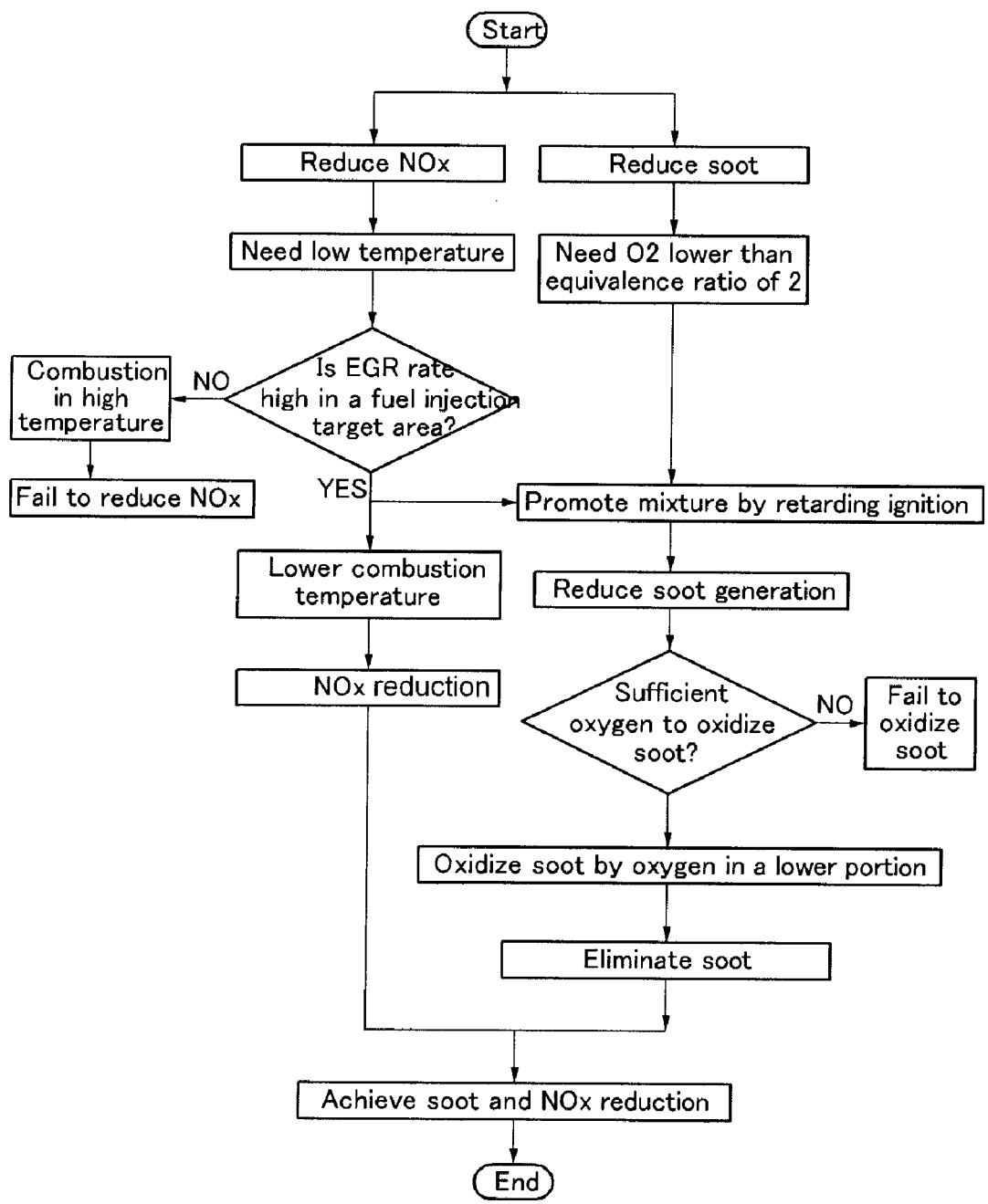
FIG. 7 is flowchart showing a process of an exemplary vehicle combustion system according to the present invention.

FIG. 7 is flowchart showing a process of a vehicle combustion system according to various embodiments of the present invention.

Referring to FIG. 7, a low combustion temperature and sufficient oxygen are necessary so as to simultaneously reduce the nitrogen oxide and the soot.

Also, when the concentration of the recirculation exhaust gas is high in the area to which the fuel is direct injected, the combustion temperature is lowered, and therefore the nitrogen oxide is reduced.

Also, when the concentration of the recirculation exhaust gas is high in the area to which the fuel is injected, the ignition is retarded, and therefore the soot is oxidized with the oxygen of the lower end portion to be eliminated.

As described above, the nitrogen oxide and the soot are simultaneously reduced by stratifying the recirculation exhaust gas in various embodiments of the present invention.

Figure 8:
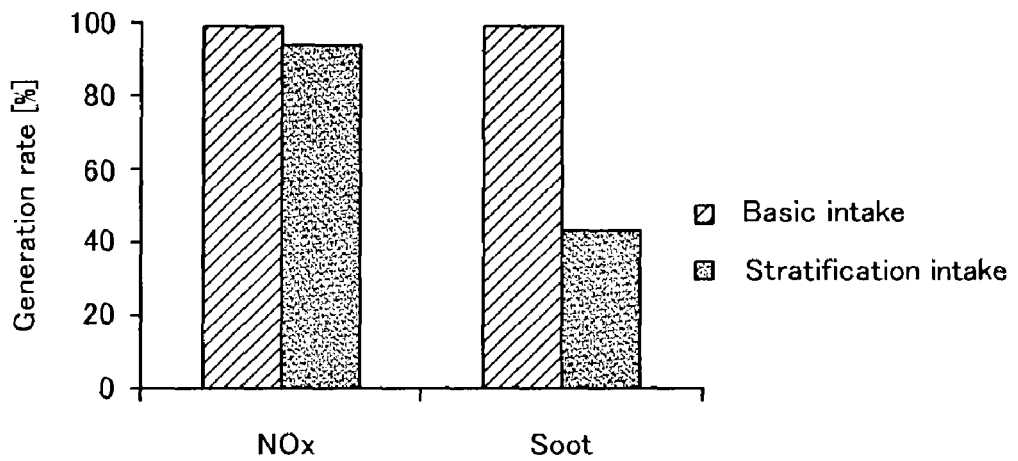
FIG. 8 is a graph showing experimental data and results of an exemplary vehicle combustion system according to the present invention.
Figure 8:

FIG. 8 is a graph showing experimental data and results of a vehicle combustion system according to various embodiments of the present invention.

Referring to FIG. 8, the experimental results show that the nitrogen oxide and the soot are reduced when the stratification is achieved compared to the basic intake state, and also the 3D analyzed results show that the nitrogen oxide and the soot were decreased. Particularly, the soot reduction amount was higher than 50%, and the reduction efficiency of the soot was higher than that of the nitrogen oxide.

In further detail, the gas having the recirculation exhaust gas amount of 30% is uniformly supplied to both intake ports in the basic intake condition and the gas having the recirculation exhaust gas of 60% is supplied to the second intake port and the air having the recirculation exhaust gas of 0% is supplied to the first intake port in the stratification condition, and the experimental results shown by the 3D CFD method shows the generation rate of the nitrogen oxide and the particulate matter such as soot in a single diesel engine.

When the exhaust gas stratification technique is applied as stated above, 5.3% of the nitrogen oxide and 56.4% of the particulate matter are reduced in the exhaust gas in the experimental results compared with the basic intake condition, and 11% of the nitrogen oxide and 81.7% of the particulate matter are reduced in the analyzed results.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A combustion system for a vehicle, comprising:
a piston in which a first combustion recess is formed in an upper end surface thereof, and at least one second combustion recess is further formed in a bottom surface of the first combustion recess;
a first intake port and a second intake port for supplying a cylinder with air; and
a controller that separately controls amounts of a recirculation exhaust gas being supplied to the first intake port and the second intake port so that EGR gas concentration of the air drawn into the cylinder through the first and second intake ports become different;
wherein the first combustion recess has a first depth from the upper end surface of the piston and the second combustion recess has a second depth that is deeper than the first depth from the upper end surface of the piston; and
wherein an exhaust gas dense portion is formed in one side among the first combustion recess and the second combustion recess, and an oxygen dense portion is formed in the other side thereof to provide a stratification of the exhaust gas simultaneously formed in a radial direction as well as in an up/down direction of the cylinder.

2. The combustion system for a vehicle of claim 1, wherein an EGR valve is on/off controlled for the recirculation exhaust gas to be supplied to the first intake port or the second intake port for a partial period while the intake valve is opened.

3. The combustion system for a vehicle of claim 2, wherein the recirculation exhaust gas is supplied to the air flowing into the intake port for a determined period until the intake valve is closed.

4. The combustion system for a vehicle of claim 1, wherein a diameter of the second combustion groove from a center portion of the piston is smaller than a diameter of the first combustion groove to form a terraced shape.

5. The combustion system for a vehicle of claim 1, wherein a slanted portion is formed on bottom of the first combustion recess and wherein the slanted portion extends toward the upper end surface of the position with a predetermined angle as the slanted portion goes to a center portion of the piston.

6. The combustion system for a vehicle of claim 5, wherein an edge side surface of the first combustion recess is disposed lower than a top surface of the slanted portion.

7. The combustion system for a vehicle of claim 1, wherein a bottom surface of the last second combustion recess is formed to be flat.

8. The combustion system for a vehicle of claim 1, wherein a fuel is injected to the exhaust gas dense portion so that combustion of the fuel can be started in the exhaust gas dense portion.

9. The combustion system for a vehicle of claim 1, wherein oxygen of the oxygen dense portion is mixed in a combustion area to oxidize and eliminate soot therein.

10. The combustion system for a vehicle of claim 1, wherein the amount of the recirculation exhaust gas that is supplied through the first intake port is smaller than that of the recirculation exhaust gas that is supplied through the second intake port.

11. The combustion system for a vehicle of claim 1, wherein the recirculation exhaust gas is not supplied to one of the first and second intake ports, and is supplied to the other.

12. A combustion system for a vehicle, comprising:
a piston that is disposed in a cylinder to perform intake, compression, power, and exhaust strokes, and in which a first combustion recess is formed in an upper end surface thereof and at least one second combustion recess is further formed at a bottom surface of the first combustion recess;
a first intake port that is connected to a first intake opening of the cylinder and a second intake port that is connected to a second intake opening of the cylinder; and
a controller that supplies a recirculation exhaust gas to the first intake port and the second intake port, and that differently controls the amount of the recirculation exhaust gas that is supplied through the first and second intake ports to stratify an exhaust gas into an exhaust-gas-dense portion and an oxygen-dense portion between the first combustion recess and the second combustion recess.

* * * * *